US011866674B2

(12) United States Patent
Savaglio et al.

(10) Patent No.: US 11,866,674 B2
(45) Date of Patent: *Jan. 9, 2024

(54) NEUTRAL FLOOR CLEANER COMPOSITIONS

(71) Applicant: S. C. JOHNSON & SON, INC., Racine, WI (US)

(72) Inventors: Carmine Savaglio, Kenosha, WI (US); Teresa L. Cook, Evanston, IL (US); Holly Ann Hale, Kenosha, WI (US)

(73) Assignee: S.C. JOHNSON & SON, INC., Racine, WI (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/330,884

(22) Filed: May 26, 2021

(65) Prior Publication Data

US 2021/0277330 A1 Sep. 9, 2021

Related U.S. Application Data

(63) Continuation of application No. 15/449,702, filed on Mar. 3, 2017, now Pat. No. 11,046,913.

(60) Provisional application No. 62/304,009, filed on Mar. 4, 2016.

(51) Int. Cl.

| | |
|---|---|
| ***C11D 1/66*** | (2006.01) |
| ***C11D 1/825*** | (2006.01) |
| ***C11D 3/20*** | (2006.01) |
| ***C11D 1/722*** | (2006.01) |
| ***C11D 3/34*** | (2006.01) |
| ***C11D 11/00*** | (2006.01) |

(52) U.S. Cl.

CPC ................ *C11D 1/66* (2013.01); *C11D 1/825* (2013.01); *C11D 3/2068* (2013.01); *C11D 3/2086* (2013.01); *C11D 3/3418* (2013.01); *C11D 11/0023* (2013.01); *C11D 1/722* (2013.01)

(58) Field of Classification Search

None

See application file for complete search history.

(56) References Cited

U.S. PATENT DOCUMENTS

| | | | |
|---|---|---|---|
| 4,749,508 | A | 6/1988 | Cockrell, Jr. et al. |
| 5,462,690 | A | 10/1995 | Rhinesmith |
| 6,019,855 | A | 2/2000 | Finch et al. |
| 6,384,010 | B1 | 5/2002 | Wagers |
| 6,530,383 | B1 | 3/2003 | Rogmann |
| 6,696,399 | B1 | 2/2004 | Chernin et al. |
| 6,716,804 | B2 | 4/2004 | Scherubel |
| 7,326,674 | B2 | 2/2008 | Sheirs et al. |
| 7,494,963 | B2 | 2/2009 | Ahmed et al. |
| 7,501,027 | B2 | 3/2009 | Ahmed et al. |
| 7,530,361 | B2 | 5/2009 | Killeen et al. |
| 7,838,485 | B2 | 11/2010 | Heisig et al. |
| 7,964,547 | B2 | 6/2011 | Underwood et al. |
| 8,114,827 | B2 | 2/2012 | Shamayeli et al. |
| 8,329,630 | B2 | 12/2012 | Finison et al. |
| 8,394,751 | B2 | 3/2013 | Hawes, III et al. |
| 8,420,586 | B2 | 4/2013 | Vinson et al. |
| 8,785,366 | B2 | 7/2014 | Mondin et al. |
| 8,895,491 | B2 | 11/2014 | Vinson et al. |
| 9,029,309 | B2 | 5/2015 | Hanson et al. |
| 11,046,913 | B2 * | 6/2021 | Savaglio ............ C11D 11/0023 |
| 2005/0065055 | A1 | 3/2005 | Barnes |
| 2007/0129278 | A1 | 6/2007 | Christmas |
| 2007/0225189 | A1 | 9/2007 | Dailey et al. |
| 2008/0015133 | A1 | 1/2008 | Rigley et al. |
| 2008/0023031 | A1 | 1/2008 | Kellar et al. |
| 2008/0251106 | A1 | 10/2008 | Scialla et al. |
| 2008/0293612 | A1 | 11/2008 | Kellar et al. |
| 2011/0319669 | A1 | 12/2011 | Yu et al. |

(Continued)

FOREIGN PATENT DOCUMENTS

| | | | |
|---|---|---|---|
| EP | 0 805 200 | A1 | 11/1997 |
| JP | 8-505413 | A1 | 6/1994 |

(Continued)

OTHER PUBLICATIONS

"Lutensol® XL Surfactants," BASF Corporation, Version: Sep. 2005, 9 pages.

Roland Bohn, "Lutensol® XL and Lutensol® XP—New Guerbet alcohol based surfactants as effective alternatives to C9C11 ethoxylates in a wide range of applications," BASF AG, Mar. 11, 2004. 26 pages. (XP002770239).

International Search Report and Written Opinion issued in corresponding PCT Application No. PCT/US2017/020679, dated May 31, 2017, 13 pages.

(Continued)

*Primary Examiner* — Nicole M. Buie-Hatcher

(74) *Attorney, Agent, or Firm* — Quarles & Brady LLP

(57) ABSTRACT

A cleaning composition that includes a first cleaning agent and a second cleaning agent. The first cleaning agent is water-soluble at room temperature and the second cleaning agent is water-insoluble at room temperature. Further, the first cleaning agent and the second cleaning agent are in a total amount of about 15 wt. % to about 30 wt. %, wherein the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order. A blend of the first cleaning agent and the second cleaning agent has a hydrophilic-lipophilic balance ranging from about 10.5 to about 12.5.

20 Claims, 1 Drawing Sheet

(56) References Cited

U.S. PATENT DOCUMENTS

| | | | |
|---|---|---|---|
| 2012/0066840 A1 | 3/2012 | Man et al. |
| 2012/0071384 A1 | 3/2012 | Christensen et al. |
| 2013/0213435 A1 | 8/2013 | Hanson et al. |
| 2013/0313154 A1 | 11/2013 | Hernandez et al. |
| 2015/0175936 A1 | 6/2015 | Kingma et al. |
| 2015/0190844 A1 | 7/2015 | Boulanger et al. |
| 2015/0210958 A1 | 7/2015 | Hanson et al. |
| 2017/0253833 A1 | 9/2017 | Savaglio et al. |

FOREIGN PATENT DOCUMENTS

| | | | |
|---|---|---|---|
| JP | 6-207195 | A1 | 7/1994 |
| JP | 10226796 | A | 8/1998 |
| JP | 11-508321 | | 7/1999 |
| JP | 200435755 | A | 2/2004 |
| JP | 2006-124627 | A | 5/2006 |
| JP | 2009-520874 | A | 5/2009 |
| JP | 2009-527611 | A | 7/2009 |
| JP | 2010-525127 | A | 7/2010 |
| JP | 2010-536950 | A | 12/2010 |
| JP | 2012-233077 | A | 11/2012 |
| JP | 2013-194212 | A | 9/2013 |
| JP | 2013-216824 | A | 10/2013 |
| JP | 2013-537580 | A | 10/2013 |
| WO | 94/12599 | A | 6/1994 |
| WO | 96/18711 | A | 6/1996 |
| WO | 99/19449 | A | 4/1999 |
| WO | 9956893 | A1 | 11/1999 |
| WO | 2006/131689 | A1 | 12/2006 |
| WO | 2009/156254 | A1 | 12/2009 |
| WO | 2013/122934 | A1 | 8/2013 |
| WO | 2015005272 | A1 | 1/2015 |

OTHER PUBLICATIONS

"Lutensol® XP types," BASF Corporation, EMV 080607e-00 Oct. 2008, 10 pages.

Office Action from Japanese Patent Application No. 2018-546517, dated Sep. 23, 2020 (13 pages).

Second Office Action from corresponding Japanese Patent Application No. JP 2018-546517, dated Jun. 1, 2021 (13 pages) (English translation included).

* cited by examiner

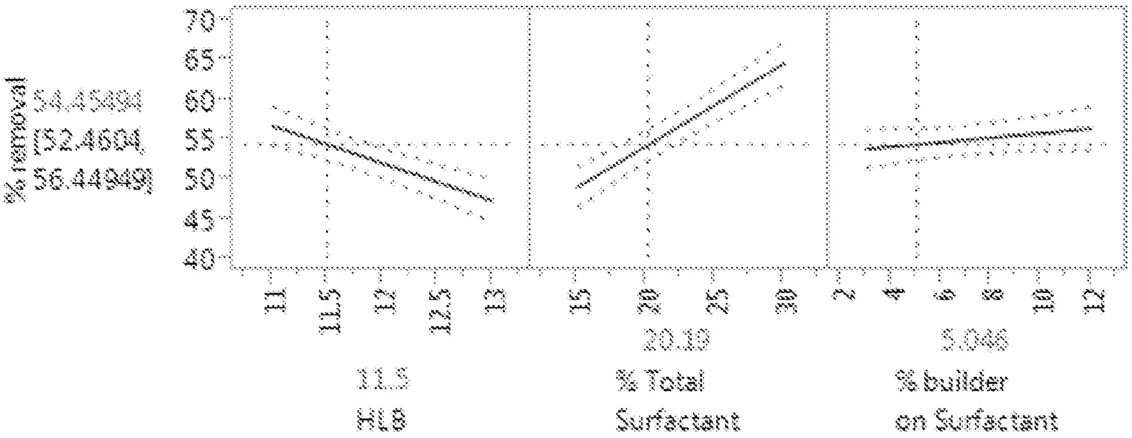
% removal
54.45494
[52.4604,
56.44949]
70
65
60
55
50
45
40
11
11.5
12
12.5
13
15
20
25
30
2
4
6
8
10
12
11.5
HLB
20.19
% Total
Surfactant
5.046
% builder
on Surfactant

NEUTRAL FLOOR CLEANER COMPOSITIONS

CROSS REFERENCE TO RELATED APPLICATIONS

This patent application is a continuation of U.S. application Ser. No. 15/449,702, filed on Mar. 3, 2017, which claims the benefit of U.S. Provisional Patent Application 62/304,009, filed on Mar. 4, 2016, the entire contents of which are hereby incorporated by reference, for any and all purposes.

FIELD OF THE INVENTION

The present disclosure generally relates to floor cleaner compositions and, more particularly, to neutral floor cleaner compositions exhibiting an increased cleaning efficiency and leaving a reduced amount of residue. In particular, the floor cleaner composition is for use on hard surfaces and may comprise water, a cleaning agent, a builder, a stabilizer, and a chelator.

BACKGROUND OF THE INVENTION

Many compositions are available for cleaning and/or treating hard surfaces, e.g., floor surfaces, to reduce soil contamination. Current cleaning compositions have either an acidic, neutral, or alkaline pH. In particular, neutral floor cleaner compositions are advantageous due to their environmentally-friendly nature and for having reduced or no toxicity to a user. For example, when an ideal neutral floor cleaner composition is used, personal protective equipment required for use with either commercially available acidic or basic cleaners may not be necessary. Further, neutral floor cleaner compositions may also cause less damage to floor surfaces than acidic or basic floor cleaner compositions, e.g., loss of gloss on the floor surface.

Many cleaning compositions remove soil from a surface by chemically converting compounds into a soap and, hence, render them water soluble, i.e., saponification, or suspending oil particles in an aqueous phase permitting them to be rinsed away, i.e., emulsification. However, in order to provide enhanced cleaning properties, such as those previously mentioned, alkaline or acidic cleaning agents may be desired. In particular, alkaline cleaning agents may help improve the cleaning efficiency by removing more soil and/or other undesired components from an applied area, compared to known neutral floor cleaning compositions.

Intuitively, high cleaning efficacy is desired for cleaning compositions. In particular, many cleaning compositions desire a formulation that has an effective soil, dirt, and/or oil removal. Additionally, many cleaning compositions desire a formulation that leaves little to no residue after use and causes reduced or no damage to the floor surface. However, many conventional cleaning compositions with optimal cleaning efficacy innately cause floor damage and/or leave residue. As follows, many cleaning compositions must sacrifice cleaning efficacy in order to prevent floor damage, or vice-versa.

Thus, it is of great importance to provide a neutral floor cleaner composition with an enhanced cleaning performance and efficiencies over commercially known and available cleaners. Specifically, a neutral floor cleaning composition is needed that may be used with little or no protective equipment while providing cleaning performance characteristics that match or exceed that of currently available floor cleaner compositions. Further, a neutral floor cleaning composition is needed that may result in less damage to floor surfaces, and reduces the level of residue left behind.

Accordingly, an advantage of an embodiment of the present disclosure is to develop neutral floor cleaner compositions with an improved cleaning performance. Another advantage of an embodiment of the present disclosure is to provide neutral floor cleaner compositions with improved cleaning efficiency, e.g., removal of the same or additional soil contamination than other commercially available cleaners. Another advantage of an embodiment of the present disclosure is to provide a neutral floor cleaner composition that provides extraordinary cleaning performance while retaining gloss of the treated floor surface and leaving reduced or no residue on the treated floor surface. The unique neutral floor cleaning composition according to an embodiment of the present disclosure, not employing acidic and/or basic solutions, produces surprising and unexpected results by providing a composition with an equal or increased cleaning efficiency as compared to existing cleaners and with little to no residue.

SUMMARY

In one embodiment, the present disclosure provides a cleaning composition with a first cleaning agent that is water-soluble at room temperature, and a second cleaning agent that is water-insoluble at room temperature. The first cleaning agent and the second cleaning agent are in a total amount of about 15 wt. % to about 30 wt. %, and the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order. Further, the blend of the first cleaning agent and the second cleaning agent has a hydrophilic-lipophilic balance ranging from about 10.5 to about 12.5.

In some embodiments, the blend of the first cleaning agent and the second cleaning agent has a hydrophilic-lipophilic balance of about 11.5. Additionally, the first cleaning agent and the second cleaning agent may be in a total amount of about 20 wt. %, and the cleaning composition further includes a builder. Further, a percent of the builder on a total amount of the first and the second cleaning agent may be in a range from about 1% to about 10%. The percent of the builder on a total amount of the first and the second cleaning agent may be about 5%, and the at least one builder may be in an amount about 0.1 wt. % to about 4 wt. %. In further embodiments, the builder may be an organic salt, and in particular embodiments, the organic salt may be a sodium citrate. In even further embodiments, one of the alkyl polyalkylene glycol ethers is water-soluble and the other of the alkyl polyalkylene glycol ethers is water-insoluble, and the composition further comprises at least one stabilizer. In these embodiments, the at least one stabilizer may make the alkyl polyalkylene glycol ether that is water-insoluble disperse in water. The cleaning composition may further include an alcohol ethoxylate, and the alcohol ethoxylate may be in an amount of about 2 wt. % to about 6 wt. %. The cleaning composition may also have a pH value of about 6.5 to about 8.5.

In another embodiment, the present disclosure provides a cleaning composition with a first cleaning agent and a second cleaning agent in a total amount of about 15 wt. % to about 30 wt. %. In this embodiment, the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order. The blend of the first cleaning agent and the second cleaning agent may have a hydrophilic-lipophilic balance ranging from about 10.5 to about 12.5, and the cleaning composition may have a pH value of 6.5 to 9.

In this embodiment, the cleaning composition may also include at least one builder, and the blend of the first cleaning agent and the second cleaning agent may have a hydrophilic-lipophilic balance of about 11.5. Further, the first cleaning agent and the second cleaning agent may be in a total amount of about 20 wt. %.

In a further embodiment, the present disclosure provides another cleaning composition with a first cleaning agent, a second cleaning agent, and a builder. In this embodiment, the first cleaning agent and the second cleaning agent are in a total amount of about 15 wt. % to about 30 wt. %, and the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order. The first cleaning agent is water-soluble at room temperature and the second cleaning agent is water-insoluble at room temperature. Further, a blend of the first cleaning agent and the second cleaning agent has a hydrophilic-lipophilic balance of about 11.5, the first cleaning agent and the second cleaning agent are in a total amount of about 20 wt. %, and the cleaning composition has a pH value of 6.5 to 9.

BRIEF DESCRIPTION OF THE DRAWINGS

FIG. 1 illustrates a relationship between a percentage soil removal of a plurality of neutral floor cleaning compositions and a hydrophilic-lipophilic balance (HLB) number, an amount of total surfactants, and an amount of a builder on the surfactants, according to embodiments of the present disclosure, and commercially known products.

Other aspects and advantages of embodiments of the disclosure will become apparent upon consideration of the following detailed description and claims, wherein similar structures have like or similar reference numerals.

DETAILED DESCRIPTION

Before any embodiments of the invention are disclosed in detail, it is to be understood that the invention is not limited in its application to the details of construction and the arrangement of components set forth in the following description or illustrated in the following drawings. The invention is capable of other embodiments and of being practiced or of being carried out in various ways.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures, which are not necessarily to scale, depict selected embodiments and are not intended to limit the scope of embodiments of the invention. Skilled artisans may also recognize that the examples provided herein have many useful alternatives and fall within the scope of embodiments of the invention.

The present disclosure is directed to neutral floor cleaner compositions and methods of using such compositions. Further, embodiments of the present cleaning composition disclosed herein exhibit improved cleaning efficacy, effective soil removal, and leave little to no residue on a treated surface applied thereto. Further, another aspect of some embodiments of the present cleaning composition provide a formulation with low initial foam and a very low foaming characteristic. In preferred embodiments, the present cleaning compositions are for use in a deep clean application, e.g., scrubbing or recoating applications. While the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

The term "about" or "approx.", as used herein, refers to variation in the numerical quantity that may occur, for example, through typical measuring and liquid handling procedures used for making concentrates or solutions in the real world; through inadvertent error in these procedures; through differences in the manufacture, source, or purity of the ingredients used to make the compositions or carry out the methods; and the like. The term "about" may also encompass amounts that differ due to different equilibrium conditions for a composition resulting from a particular initial mixture. In one embodiment, the term "about" refers to a range of values +/−5% of a specified value.

The term "concentrated", as used herein, refers to compositions which are formulated in non-diluted formulas for sale, shipping, storing or any other suitable situation. These non-diluted formulas are designed to be diluted with water before use. The terms "diluted" and "ready-to-use," as used herein, may refer to compositions which are meant to be used as-is without further dilution. It should be appreciated that the concentrated cleaning solution disclosed herein may be diluted as desired. In a preferred embodiment, the concentrated cleaning solution may be diluted with water from about 1:64 to about 1:1024, by volume.

Throughout the application, deionized (DI) water may be used to make the present neutral floor cleaner composition. Applicant, however, envisions that any other type of water may also be suitable for the present disclosure.

The term "soil", as used herein, refers to a soil, formed on a hard surface such as, but not limited to, a grouted quarry tile floor or the like, comprising a mixture of at least two components selected from a group including a proteinaceous soil, a carbohydrate soil, soil derived from hardness components or cleaning materials or both, a fatty soil comprising free fatty acids or fatty acid salts of sodium, calcium, magnesium, etc., and neutral fats or mixtures thereof. Further the term "soil" may also refer to oil or oil blends. In general, the term "soil", as used herein, generally refers to any foreign matter on a surface.

The term "cleaning", as used herein, refers to performing or aiding in soil removal, bleaching, microbial population reduction, rinsing, or combinations thereof. The term "cleaning agents", as used herein, refers to any compounds or substances that can remove all or portions of a soil contaminant or a plurality of soil contaminants from a hard surface. In one embodiment, the cleaning agents of the present disclosure may comprise a nonionic surfactant.

The term "weight percent", "wt. %", "percent by weight", "% by weight", and variations thereof, as used herein, refer to the concentration of a substance as the weight of that substance divided by the total weight of the composition and multiplied by 100. It is understood that, as used here, "percent", "%", and the like may be synonymous with "weight percent", "wt. %", etc.

The term "water soluble", as used herein, refers to a compound that may be dissolved in water at a significant concentration, e.g., more than about 1 wt. %, at room temperature (23° C.). The term "water insoluble", as used herein, refers to a compound that can be dissolved in water only to an insignificant concentration, e.g., less than about 0.1 wt. %, at room temperature (23°).

The term "hard surface", as used herein, may include floors, walls, showers, sinks, toilets, bathtubs, countertops, windows, mirrors, vehicles, and the like. In one preferred embodiment, the cleaning compositions are used to clean hard floor surfaces. Further, any surface is contemplated to which the present neutral cleaner product may be applied and/or affixed, including, for example, soft surfaces such as carpets, rugs, draperies, curtains, upholstery, and the like. In addition, the present neutral cleaner product may be applied to other hard substrates as well, including, for example, wood, metal, ceramic, glass, a polymer, a hard floor tile, a painted surface, paper, masonry material, rock, a fiber/composite material, rubber, concrete, and the like. It is also contemplated that the present neutral cleaner product may be applied to any prepared surface, including, for example, pre-dyed, post-dyed, pre-manufactured, post-manufactured surfaces, and the like. Further, the present neutral cleaner product may be applied during the manufacturing process of a particular good or object that includes a surface. Surfaces to which the present neutral cleaner product may be applied and/or affixed may be dry, substantially dry, wet, substantially wet, moist, or humid depending on the particular present neutral cleaner product utilized. Further, the present neutral cleaner product of the present disclosure may be applied to a substantially flat, smooth, and/or level surface or any other surface including rough, bumpy, non-smooth, stepped, sloped, slanted, inclined, declined, and/or disturbed surfaces.

The term "alkyl", as used herein, is inclusive of both straight chain and branched chain groups and of cyclic groups. Straight chain and branched chain groups may have up to about 30 carbon atoms unless otherwise specified. Cyclic groups can be monocyclic or polycyclic, and, in some embodiments, may have from about 3 to about 10 carbon atoms. The term "branched", as used herein, refers to any alkyl or similar group whose chain structure has at least one secondary and/or tertiary carbon.

Cleaning Agents/Surfactants

The neutral floor cleaning composition of an embodiment of the present disclosure necessarily includes at least one cleaning agent, or more specifically at least one surfactant, to ensure optimal cleaning efficacy. In a preferred embodiment, the neutral floor cleaning composition comprises two, or preferably three surfactants. Further, surfactants were chosen to provide an improved cleaning efficacy, comparative to presently known neutral floor cleaning compositions, while leaving a reduced or no residue and/or streaking on a surface the cleaning composition is applied thereon. Particular surfactants with the aforementioned properties are further discussed herein.

In general, surfactants may be incorporated in the floor cleaner composition in a plurality of ranges. In one embodiment, the cleaning composition comprises a surfactant or a combination of surfactants in an amount ranging from about 4% to about 40%, and in a preferred embodiment, in an amount ranging from about 5% to about 25%.

The term "surfactant", as used herein, refers to a chemical compound that lowers the interfacial tension between two liquids. The term "nonionic surfactant", as used herein, refers to a surfactant where the molecules forming the surfactant are uncharged.

Nonionic surfactants may include long chain alcohols, such as, for example, fatty alcohols, cetyl alcohol, stearyl alcohol, cetostearyl alcohol (consisting predominantly of cetyl and stearyl alcohols), and oleyl alcohol. Nonionic surfactants may include polyoxyethylene glycol alkyl ethers $CH_3—(CH_2)_{10-16}—(O—C_2H_4)_{1-25}—OH$, such as octaethylene glycol monododecyl ether or pentaethylene glycol monododecyl ether. Nonionic surfactants may also include polyoxypropylene glycol alkyl ethers $CH_3—(CH_2)_{10-16}—(O—C_3H_6)_{1-25}—OH$. Nonionic surfactants may also include glucoside alkyl ethers $CH_3—(CH_2)_{10-16}—(O\text{-Glucoside})_{1-3}\text{-}OH$, such as decyl glucoside, lauryl glucoside, and octyl glucoside. Nonionic surfactants may further include polyoxyethylene glycol octylphenol ethers $C_8H_{17}—(C_6H_4)—(O—C_2H_4)_{1-25}—OH$, such as Triton X-100, which may be purchased from Sigma Aldrich. Nonionic surfactants may also include polyoxyethylene glycol alkylphenol ethers $C_9H_{19}—(C_6H_4)—(O—C_2H_4)_{1-25}—OH$, such as Nonoxynol-9. Nonionic surfactants may further include glycerol alkyl esters such as glyceryl laurate. Nonionic surfactants may also include polyoxyethylene glycol sorbitan alkyl esters (e.g., polysorbate), sorbitan alkyl esters (e.g., spans), cocamide MEA, cocamide DEA, dodecyldimethylamine oxide, block copolymers of polyethylene glycol and polypropylene glycol (e.g., poloxamers), or polyethoxylated tallow amine (e.g., POEA) or any other suitable compound. In one embodiment, the nonionic surfactants of the disclosure comprise alkyl polyalkylene glycol ethers and/or an alcohol ethoxylate. In one embodiment, the nonionic surfactants of the present invention may further comprise alkyloxypolyethyleneoxyethanols and/or an alcohol ethoxylate.

The terms "alkyl ethoxylate alcohol," "ethoxylate alcohol", "ethoxylated alcohol", and "alcohol ethoxylate", as used herein, may refer to the same composition and may be used interchangeably. Further, the term "alkyl ethoxylate alcohol", as used herein, may refer to a compound having the chemical formula $RO(CH_2CH_2O)_mH$, wherein m is an integer from about 1 to about 15, inclusive, and R is a linear or branched aliphatic radical comprising from about 6 to about 24 carbon atoms, inclusive, in the alkyl moiety, and having a hydrophilic-lipophilic balance (HLB) number from about 1 to about 18, inclusive, and preferably a HLB number from about 10.5 to about 12.5, inclusive. Preferably, the alkyl ethoxylate alcohol comprises an R group having from about 8 to about 20 carbon atoms, inclusive, and is one of a linear primary ethoxylated alcohol, a branched primary ethoxylated alcohol, or a secondary ethoxylated alcohol. More preferably, the R group has from about 11 to about 16 carbon atoms, inclusive. With regard to the ethoxylate groups, it is preferable that m is a number from about 1 to about 5, inclusive. In some embodiments, alkyl ethoxylate alcohols of the disclosure are ethoxylated Guerbet alcohols.

The term "Guerbet alcohol", as used herein, refers to primary alcohols with beta branching that have been produced using Guerbet synthesis reactions. Further, the terms "ethoxylated Guerbet alcohols" or "Guerbet surfactants", as used herein, refer to surfactants produced from Guerbet alcohols. For example, a Guerbet surfactant may include a nonionic surfactant produced from a Guerbet alcohol and an alkylene oxide or an ethylene oxide.

In one preferred embodiment, the terms "alkyl ethoxylate alcohol" may also include branched alcohol alkoxylates where there is at least one $C_1$-$C_4$ alkyl group on one of a methylene group of the repeating ethoxy groups. In some embodiments, alkyl ethoxylate alcohols or ethoxylated Guerbet alcohols are commercially available products.

Other examples of commercially available ethoxylated alcohol products may further include Genapol® UD types from Clariant, such as Genapol® UD 030 ($C_{11}$-oxo-alcohol polyglycol ether with 3 EO), Genapol® UD 050 ($C_{11}$-oxo-alcohol polyglycol ether with 5 EO), Genapol® UD 079, Genapol® UD 080 ($C_{11}$-oxo-alcohol polyglycol ether with 8 EO), Genapol® UD 088, and Genapol® UD 110 ($C_{11}$-oxo-alcohol polyglycol ether with 11 EO). Other examples of commercially available products may include Genapol® X products provided by Clariant, such as Genapol® X 040 (Iso-tridecyl alcohol polyglycol ether with 4 EO) and Genapol® X 080 (Iso-tridecyl alcohol polyglycol ether with 8 EO).

In one embodiment, the composition includes at least two cleaning agents. In this particular embodiment, the at least two cleaning agents comprise two nonionic surfactants. In this embodiment, the two nonionic surfactants are alkoxylated Guerbet alcohols produced from a Guerbet synthesis reaction. In particular, the two nonionic surfactants are alkyl polyalkylene glycol ethers having the formula of $RO(LO)_k(CH_2CH_2O)_mH$, wherein R is a $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order. Preferably, R may be a branched alkyl group. Further, in the preferred embodiment, one of the two alkyl polyalkylene glycol ethers is water-soluble and the other is water-insoluble. Each of the two alkyl polyalkylene glycol ethers are in an amount of at least about 2% by weight and, as mentioned, in the preferred embodiment, the two alkyl polyalkylene glycol ethers are in an amount of about 4% to about 40%. Examples of commercially available alkyl polyalkylene glycol ethers that may be used as cleaning agents or surfactants herein may include, but not limited to, Lutensol® XL types manufactured by BASF, e.g., Lutensol® XL 40, Lutensol® XL 50, Lutensol® XL 60, Lutensol® XL 70, Lutensol® XL 79, Lutensol® XL 80, Lutensol® XL 90, Lutensol® XL 99, Lutensol® XL 100, and Lutensol® XL 140. The Lutensol® XL types have the following structure: $C_{10}H_{21}O(CH_2CH_2CH_2O)_a(CH_2CH_2O)_bH$ where a has an average value of 1.0 to 1.5, and b is 4 to 14. As examples, in Lutensol® XL 40 (HLB=10.5), b equals 4, and in Lutensol® XL 70 (HLB=12.5-13.0), b equals 7.

In addition, in a preferred embodiment, the at least two cleaning agents further comprise a third cleaning agent. It is contemplated that the third cleaning agent may be another nonionic surfactant. In one particular embodiment, the third cleaning agent is an alkyloxypolyethyleneoxyethanol or an alcohol ethoxylate. In one embodiment, the alkyloxypolyethyleneoxyethanol or alcohol ethoxylate is in an amount of about 1% to about 15%, and most preferably about 2% to about 6% based on a total weight of the composition. Examples of commercially available alcohol ethoxylates may be TERGITOL' 15-S-7 or similar compounds.

In the preferred embodiment, the aforementioned surfactants, in addition to the particular combination of the surfactants, exhibit a high cleaning efficacy, i.e., a relatively high percent removal of a soil, and leave little to no residue.

Hydrotrope or Stabilizing Agent

The term "stabilizing agent" or "stabilizer", as used herein, refers to any compound or substance that may stabilize the present neutral cleaner compositions. In one embodiment, the stabilizer may be an anionic surfactant.

The term "anionic surfactant", as used herein, refers to a surfactant containing an anionic functional group, such as a sulfate, a sulfonate, a phosphate, and/or a carboxylate. Prominent alkyl sulfates include ammonium lauryl sulfate, sodium lauryl sulfate, sodium dodecyl sulfate (SDS), and the related alkyl-ether sulfates sodium laureth sulfate, also known as sodium lauryl ether sulfate (SLES), and sodium myreth sulfate. Anionic surfactants may also include docusates such as a dioctyl sodium sulfosuccinate, a perfluorooctanesulfonate (PFOS), a perfluorobutanesulfonate, and a linear alkylbenzene sulfonate (LABs). Anionic surfactants may also include an alkyl-aryl ether phosphate and an alkyl ether phosphate, or any other suitable anionic surfactant.

The stabilizer or anionic surfactant may be present in the neutral floor cleaning composition in an amount of about 1% to about 20%, based on a total weight of the composition. Further, the stabilizer or anionic surfactant may be present in a preferred amount of about 5% to about 16% and most preferably about 8% to about 10%, based on a total weight of the composition.

In one embodiment, the stabilizer is a hydrotrope. The term "hydrotrope", as used herein, may refer to a compound that solubilizes hydrophobic compounds in aqueous solutions. Typically, hydrotropes consist of a hydrophilic portion and a hydrophobic portion, like surfactants, but the hydrophobic portion is generally too small to cause spontaneous self-aggregation. Hydrotropes may not have a critical concentration above which self-aggregation 'suddenly' starts to occur (as found for micelle- and vesicle-forming surfactants, which have a critical micelle concentration or cmc and a critical vesicle concentration or cvc, respectively). Instead, some hydrotropes aggregate in a step-wise self-aggregation process, gradually increasing aggregation size. However, many hydrotropes do not seem to self-aggregate at all, unless a solubilisate has been added. Hydrotropes may be in use industrially. Examples of hydrotropes may include, but are not limited to, a metal p-toluenesulfonate and a metal xylene sulfonate, such as sodium p-toluenesulfonate and/or sodium xylene sulfonate. Another example of a hydrotrope is a metal cumene sulfonate, such as a sodium cumene sulfonate.

In one embodiment, a hydrotrope is necessary to produce a clear aqueous solution of the neutral floor cleaner compositions. For example, in an embodiment that comprises a non-soluble surfactant in the neutral floor cleaner composition, a hydrotrope may be necessary to yield a clear aqueous solution.

In a preferred embodiment, the stabilizer is a sulfonate. Further, in one embodiment, the stabilizer may be a sodium xylene sulfonate. In an alternative embodiment, the stabilizer is sodium cumene sulfonate.

pH Adjusting Agent

In some embodiments, the neutral floor cleaner composition may further comprise a pH adjusting agent. In particular, the pH adjusting agent may be used to neutralize one or more components in the composition, such as an anionic surfactant. In one particular embodiment, the pH adjusting agent is an alkylamine counterion in an amount of about 0.01% to about 2%, more preferably about 0.05% to about 1%, and most preferably about 0.07% to about 0.09% based on a total weight of the composition.

The pH adjusting agent of the present cleaner composition is present in such a concentration that the pH value of the composition in the concentrated form is in the range of about 6.5 to about 9 and the pH value of the composition in a diluted form is maintained in a range from about 6.5 to about 8.5, or preferably about 7.

The term "pH adjusting agent", as used herein, may generally refer to a substance used to adjust the pH value of the neutral floor cleaning composition. General pH adjusting agents may include, but are not limited to, an organic salt, an acid, including an organic acid or an inorganic acid; a base; a neutralizing agent; and/or a buffer system. Suitable acids may include an aliphatic organic acid, for example, a monocarboxylic acid, a dicarboxylic acid, or a polycarboxylic acid, such as tartaric acid, oxalic acid, malic acid, citric acid, and ascorbic acid; an aromatic organic acid, for example, benzoic acid, salicylic acid, and caffeic acid; and an inorganic acid, for example, hydrochloric acid, sulfuric acid, and nitric acid or any other suitable acid. Suitable bases may include, for example, sodium hydroxide, potassium hydroxide, ammonia, sodium carbonate, sodium bicarbonate, potassium carbonate, and potassium bicarbonate or any other suitable base. Suitable buffer systems may include, but are not limited to, a TAE buffer system, a TBE buffer system, an EDTA buffer system, an EGTA buffer system, a Tris-HCl buffer system, a citrate buffer system, a phosphate buffer system, an acetate buffer system, an SSC buffer system, an SSPE buffer system, a 2-(N-morpholino)ethanesulfonic acid (IVIES) buffer system, and a piperazine-N,N'-bis(2-ethanesulfonic acid) (PIPES) buffer system or any other suitable buffer.

In one preferred embodiment, the pH adjusting agent is an alkylamine counterion, preferably any monopropanolamine counterion that can neutralize most anionic surfactants. The term "alkylamine counterion", as used herein, refers to a counterion comprising at least one carbon atom and an amine. When neutralizing the anionic surfactant, the alkylamine forms a cationic, a conjugate acid of the molecule. This cation may properly be referred to as an "alkylammonium" counterion, however, for the sake of consistency, the term "alkylamine" or "alkylamine counterion" may also be used for purposes of this disclosure. Preferably, the alkylamine counterion may comprise at least 2 or even at least 3 carbon atoms. The alkylamine counterion may further comprise about 4, 5, or more carbon atoms, but may usually comprise 3 carbon atoms. The alkylamine counterion preferably comprises a substitution of hydroxyl. Examples of alkylamine counterions include monoethanolamine (MEA), choline, and propanolamine counterions and the like.

In one preferred embodiment, the alkylamine counterion is a propanolamine counterion. The term "propanolamine", as used herein, refers to "monopropanolamines." Upon neutralization of the anionic surfactant, the propanolamine may form the cationic or a conjugate acid of the molecule. This cation may properly be referred to as a "propanolammonium" counterion, however, for the sake of consistency, the term "propanolamine" or "propanolamine counterion" may also be used for purposes of this disclosure. As used herein, "propanolamine counterion", or the use of the term "propanolamine" in the context of an ion refers to the cationic, conjugate acid of the propanolamine. Preferred propanolamines suitable for use as counterions in some embodiments of the present disclosure include 2-amino-1-propanol ("2AP"), monoisopropanolamine ("MIPA" or "1-amino-2-propanol"), and l-amino-3-propanol, and the like. The isopropanolamines are basic chemicals that can be used in many applications to achieve basicity, buffering, and/or alkalinity objectives. Further, the isopropanolamines may solubilize oil and/or fat components, and may be used to neutralize fatty acids and/or sulfonic acid-based surfactants.

In some embodiments, the pH adjusting agent may further comprise monoethanolamine, monoisopropanolamine, triethanolamine, caustic soda, caustic potash, citric acid, lactic acid, ammonia, and the like. In a preferred embodiment, the pH adjusting agent of the present disclosure is MIPA.

Chelator

Chelators may also be incorporated in the neutral floor cleaning composition disclosed herein in an amount ranging from about 0.1% to about 4% and most preferably in an amount ranging from about 0.5% to about 1%. In general, the term "chelator" or "metal chelator," as used herein, refers to a compound which may bind a metal. Metal chelators may include divalent metal chelators, e.g., ethylenediaminetetraacetic acid (EDTA), [ethylenebis (oxyethylenenitrilo)] tetraacetic acid (EGTA), 1,2-bis(2-aminophenoxy)ethane-N,N,N'N'-tetraacetic acid (BAPTA), hydroxyethyl ethylene diamine triacetic acid (HEDTA), iminodisuccinate, and/or salts thereof. Metal chelators may also include N,N-Bis(carboxymethyl)-DL-alanine trisodium salt (or trisodium nitrilotriacetate) or any other suitable chelator.

In one embodiment, the chelator of the present disclosure is an iminodisuccinate. In one specific embodiment, the chelator of the present disclosure is a tetrasodium iminodisuccinate.

In a further embodiment, the at least one chelator comprises at least one compound selected from the group consisting of ethylenediaminetetraacetic acid (EDTA), [ethylenebis (oxyethylenenitrilo)] tetraacetic acid (EGTA), 1,2-bis(2-aminophenoxy)ethane-N,N,N'N'-tetraacetic acid (BAPTA), hydroxyethyl ethylene diamine triacetic acid (HEDTA), and iminodisuccinate or salts thereof. In one preferred embodiment, the at least one chelator may be a metal iminodisuccinate, such as, but not limited to, a tetrasodium iminodisuccinate.

Builder

The neutral floor cleaning composition may also include a builder that may add additional alkalinity to the cleaning composition. In particular, the term "builder," as used herein, may also refer to a compound or substance that may stabilize another compound or composition by neutralizing the compound or composition. Further, builders may sequester calcium and magnesium hardness ions that might otherwise bind with and render the auxiliary surfactants or co-surfactants less effective. The builder may also be especially useful when auxiliary surfactants or co-surfactants are employed, and are even more useful when the compositions are diluted prior to use with exceptionally hard tap water, e.g., above about 12 grains/gallon.

In one embodiment, a builder of the present disclosure may be a metal salt and in an alternative embodiment, the builder may be an organic salt. More preferably, the organic salt may be a metal citrate, e.g., an alkali metal citrate such as a sodium citrate. In some embodiments, the builder of the present disclosure may also include a salt of a carbonate, a phosphate, a sulfate, a citrate (other carboxylates), a silicate, a zeolite or a phosphonate.

In a preferred embodiment, the present neutral floor cleaner composition comprises at least one builder to stabilize the surfactants. It is contemplated that the at least one builder may be, but is not limited to, an organic salt; an acid, including an organic acid or an inorganic acid; a base; a neutralizing agent; and/or a buffer system. As such, the builder may also act as a pH adjusting agent and/or a chelant. In one preferred embodiment, the at least one builder and/or pH adjusting agent may be an organic salt and may further be a metal citrate, such as sodium citrate. In one embodiment, the at least one builder may be present in the neutral floor cleaning composition in an amount of about 0.1% to about 4% and most preferably in an amount of about 0.5% to about 1.5%, based on a total weight of the composition.

In specific embodiments, the builder has a relative ratio and/or percentage to the cleaning agent and/or surfactants or the combination of the cleaning agents and/or surfactants. In some embodiments, the percent builder on the at least one cleaning agent is about 1% to about 10%, and in preferred embodiments the percent builder on the at least one cleaning agent is about 1% to about 6%. Further, in specific embodiments, the builder may have a relative ratio and/or percentage to the at least one alkyl polyalkylene glycol ether. In this embodiment, the builder has a ratio of the alkyl polyalkylene glycol ether to the builder of about 1:1 to about 10:1, and in a preferred embodiment of about 1:1 to about 6:1.

Water

In a preferred embodiment, the present neutral floor cleaner composition is an aqueous solution. As such, the present neutral floor cleaner composition may include water as a solvent. Further, in an embodiment, water is the only solvent present in the neutral floor cleaner composition. Water may be present in an amount ranging from about 50% to about 80% based on a total weight of the composition. In another embodiment, the water may be in an amount of about 55% to about 75%, more preferably about 60% to about 70%, and most preferably about 64% to about 68% based on a total weight of the composition.

Miscellaneous Components

The cleaning composition preferably includes at least one of an additive such as a preservative, a defoamer, a fragrance, a corrosion inhibitor, and/or a dye. The term "additive," as used herein, may refer to a compound or substance that may be added to another substance or product for its ability to alter the properties of the other substance or product. For example, an additive may be an emulsifier, a defoamer, a corrosion inhibitor or the like. The term "emulsifier," as used herein, may refer to a substance that stabilizes an emulsion by increasing its kinetic stability. One class of emulsifiers is known as "surface active agents," or surfactants. Alternatively, the emulsifier or additive may be a fatty acid. Fatty acids may be incorporated into the cleaning composition and may be suitable for emulsifying similar fats from surfaces applied thereto. The fatty acids may be obtained from a natural fat and/or oil, such as those from animal fats and greases and/or from vegetable and seed oil, e.g., tallow, fish oil, grease, coconut oil, palm oil, peanut oil, corn oil, and the like. In a preferred embodiment, a coconut fatty acid may be used. In one specific embodiment, the coconut fatty acid is a commercially available product under the trade name VDISTILL™ provided by Vantage Oleochemicals. In addition, in one specific embodiment, the neutral floor cleaning composition may further include at least one corrosion inhibitor as an additive. For example, in a preferred embodiment, the corrosion inhibitor is a sodium phosphate that may be monobasic or dibasic. Further, the additives may be present in the composition with each in an amount ranging from about 0.1% to about 3% by weight to the total composition.

It may also be desirable to add sufficient fragrance that may be perceived during application of the cleaning composition and possibly a temporarily lasting scent thereafter. The fragrance may be any water soluble fragrance substance or mixture of such substances including those which are naturally derived (i.e., obtained by extraction of flower, herb, blossom or plant), those which are artificially derived or produced (i.e., a mixture of natural oils and/or oil constituents), and those which are synthetically produced substances (odiferous substances) or any combination thereof. In one embodiment, a commercially available fragrance may be used. In the simplest embodiment, the fragrance may be incorporated in the cleaning composition in an amount ranging from about 1% to about 3%, by total weight of the composition.

The cleaning composition may also contain a colorant or dye. In particular, the dyes may include a pigment, or other colorants, chosen so that they may be compatible with the other components of the cleaning composition and further chosen so that they do not stain the surface the cleaning composition may be applied thereto. For instance, a preferred dye for use in an embodiment of the present cleaning composition is Liquitint® Crimson dye or Liquitint® Brilliant Orange dye in an amount ranging from about 0.001% to about 0.1% by total weight of the composition.

Other optional additives that may be included in embodiments of the present cleaning composition, may include, but are not limited to, thickeners, sequestrants, perfumes, salts, brighteners, enzymes, preservatives, and the like. The optional additives may be employed in the compositions to enhance aesthetics and/or cleaning performance. However, these additives must be compatible with the active components in the composition and should not interfere with the inhibition of vinyl staining as discussed herein.

Further, in one embodiment, the composition is provided with a viscosity ranging from about 20 cP to about 30 cP, more preferably from about 25 cP to about 30 cP, and most preferably from about 28 cP to about 29 cP. In some embodiments, the composition may also have a specific gravity of about 1 to about 1.1 and more preferably of about 1 to about 1.03. Additionally, in some embodiments, the composition has a percent solid from about 20% to about 30% and more preferably in an amount from about 24% to about 26%.

Dilutions

The present disclosure provides embodiments of a neutral floor cleaner composition. In the present embodiment, the neutral floor cleaner composition may be offered as a concentrate with a pH range of about 6.5 to about 9. In this instance, the present neutral floor cleaner composition may be formulated in a non-diluted formula for sale, shipping, storing or any other suitable purpose. Alternatively, the neutral floor cleaner composition may be offered as a ready-to-use composition, i.e., a dilution from the concentrate. In this particular embodiment, the concentrated formula may be designed to be diluted with water before use. Alternatively, the neutral floor cleaning composition may be simply provided as a ready-to-use composition. Any suitable amount of water may be added to the concentrated solution to make it ready-to-use or a dilution of an embodiment of the present disclosure. For example, such a dilution or a ready-to-use composition of the present disclosure may be made by adding water to a concentrate as disclosed herein at a ratio of about 1:16 to about 1:3072, preferably about 1:32 to about 1:2048, and more preferably about 1:64 to about 1:1024 parts concentrated neutral cleaning composition to water. However, in the diluted form, it is desired that the neutral floor cleaning composition maintains a pH value around 7, i.e., in a range from about 6.5 to about 8.5.

As described herein, an embodiment of the present composition for a neutral floor cleaner comprises novel and non-obvious combinations of components, including water, at least one water-soluble alkyl polyalkylene glycol ether and at least one water-insoluble alkyl polyalkylene glycol ether, at least one builder of organic salt (e.g., a metal citrate), at least one stabilizer (e.g., a hydrotrope), and at least one chelator.

Method of Use

Some embodiments of the neutral floor cleaning compositions of the present disclosure may be used in accordance with conventional or otherwise known industrial floor cleaning methods and with conventional equipment to provide cleaning and enhanced polishing benefits. Advantageously, personal protective equipment required for use with many floor cleaners may not necessary with the compositions of the present disclosure. Further, the novel and non-obvious combinations of chemicals as active ingredients in the present neutral floor cleaning compositions allow consumers to clean a floor surface, or any other hard surface, more efficiently and more effectively leaving reduced or no residual residue or streaking. As such, the unique formulations disclosed herein yield surprising and unexpected results over those employing other combinations of known commercial products.

In an embodiment, a method of cleaning a floor surface under a neutral pH condition comprises the steps of: (a) preparing a cleaning solution by mixing a concentrated neutral floor cleaner and water at a ratio of about 1:64 to about 1:1024, the concentrated neutral floor cleaner comprising: (i) water in an amount of about 50% to about 70% based on a total weight of the cleaner; (ii) at least two alkyl polyalkylene glycol ethers having the formula of $RO(LO)_k(CH_2CH_2O)_mH$, wherein R is a $C_8$-$C_{12}$ alkyl group, L is $CH_2CH_2CH_2$ or $CH_2CH_2CH_2CH_2$, k is from 1-2, m is from 2 to 14, the LO and $CH_2CH_2O$ groups are in random or block order, and wherein the at least two alkyl polyalkylene glycol ethers are in an amount of about 4% to about 30%, and preferably about 9% to about 20% based on a total weight of the cleaner; (iii) at least one pH adjusting agent in an amount of about 0.01% to about 1% based on a total weight of the cleaner so that the pH value of the cleaner is in the range of about 6.5 to about 9; (iv) at least one stabilizer, e.g., a hydrotrope; and (v) at least one chelator, and (b) applying the cleaning solution to a floor.

A preferred method for cleaning floor surfaces may utilize an automatic scrubber. Such automatic scrubbers are commercially available and may automatically apply the cleaning composition, scrub the floor, and/or squeegee the floor to remove a used cleaning composition. One preferred method for cleaning floors with an automatic scrubber utilizes a diluted neutral cleaning composition, which is prepared by adding tap water, or water from any other suitable source, to the concentrated neutral cleaning composition at a ratio of about 1:64 to about 1:1024 parts concentrated neutral cleaning composition to water. The resulting diluted composition may comprise from about 100 ppm to about 12000 ppm of a nonionic surfactant, and from about 1 ppm to about 100 ppm of a builder.

In another preferred method, the concentrated neutral floor cleaning composition is first diluted with water at a ratio of about 1:64 to about 1:1024 parts concentrated cleaning composition to water. The diluted composition comprises from about 100 ppm to about 12000 ppm of a nonionic surfactant as described herein. The diluted composition may also comprise a nonionic surfactant at a level of from about 200 ppm to about 12000 ppm, and additionally may comprise a builder at a level of from about 1 ppm to about 100 ppm. The diluted composition may then be applied to the floor using a mop or any other suitable method and allowed to dry without rinsing.

Any of the embodiments described herein may be modified to include any of the structures or methodologies disclosed in connection with other embodiments. Further, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

EXAMPLES

The present disclosure is further illustrated by the following examples, which should not be construed as limiting in any way. Unless otherwise stated, all percentages recited in these examples are weight percentages based on the total specified composition weight. Further, as previously noted, the cleaning compositions, as disclosed herein, exhibit optimal cleaning efficacy with little to no residue and/or streaking on a surface applied thereto. As such, the following examples, and the experiments disclosed therein, provide comparative results showing such.

Example 1

Table 1 lists several compositions according to some embodiments of the present neutral floor cleaning composition. The numerical entries in the table are weight percentages, i.e., weight %, of the specific component, based on the total composition weight. As such, the following five compositions, i.e., Compositions 1-5, were produced as shown below, and subsequently used in relative performance testing as described herein.

TABLE 1

Neutral Floor Cleaning Compositions

| Description | 1 | 2 | 3 | 4 | 5 |
|---|---|---|---|---|---|
| Deionized Water | 66.6574 | 72.065 | 49.915 | 71.715 | 57.615 |
| Sodium Citrate, granular | 1.000 | 0.450 | 3.600 | 1.800 | 0.900 |
| Tergitol ™ 15-s-7 (secondary alcohol ethoxylate, 7 mol EO) | 5.000 | 1.875 | 3.750 | 0.000 | 0.000 |

TABLE 1-continued

| Neutral Floor Cleaning Compositions | | | | | |
|---|---|---|---|---|---|
| Description | 1 | 2 | 3 | 4 | 5 |
| Sodium xylene sulfonate, 40% | 9.000 | 11.000 | 15.000 | 10.000 | 10.000 |
| VDISTILL ™ DC01 Coconut fatty acid | 0.400 | 0.400 | 0.400 | 0.400 | 0.400 |
| Monoisopropanolamine (MIPA), 99% | 0.085 | 0.085 | 0.085 | 0.085 | 0.085 |
| Commercially Available Fragrance | 2.000 | 1.000 | 1.000 | 1.000 | 1.000 |
| Lutensol ® XL-70 (HLB = 13) | 9.000 | 1.875 | 3.750 | 15.000 | 30.000 |
| Lutensol ® XL-40 (HLB = 10.5) | 6.000 | 11.250 | 22.500 | 0.000 | 0.000 |
| Tetrasodium Iminodisuccinate, 34% | 0.750 | — | — | — | — |
| Liquitint ® Crimson Dye | 0.0076 | — | — | — | — |
| Proxel ® GXL | 0.100 | — | — | — | — |
| Total | 100.00 | 100.000 | 100.000 | 100.000 | 100.00 |

Table 2 lists measured composition properties and characteristics of Compositions 1-5. In particular, the HLB (Total) value was calculated by taking the molecular mass of the hydrophilic portion of the surfactants and dividing by the molecular mass of the surfactants and then multiplying by 20, and the percent builder on surfactants was calculated by dividing the percent builder by the total percent of surfactants then multiplying by 100.

The HLB value or number represents a relationship or balance between a hydrophilic portion of the surfactants and a lipophilic portion of the surfactants. In short, the higher the degree of hydrophilicity, the higher the HLB value, and the higher the lipophilicity, the lower the number. The HLB value may be as low as 4 and as high as 18.

TABLE 2

| Composition Properties | | | | | |
|---|---|---|---|---|---|
| Property | 1 | 2 | 3 | 4 | 5 |
| % XL Surfactant | 15.00 | 13.125 | 26.25 | 15.00 | 30.00 |
| HLB (Total) | 12.03 | 11.00 | 11.00 | 13.00 | 13.00 |
| % Surfactant Solids | 20.00 | 15.00 | 30.00 | 15.00 | 30.00 |
| % Tergitol ™ 15-s-7 | 5.00 | 1.875 | 3.75 | 0.00 | 0.00 |
| % Builder on Surfactants | 5.00 | 3.00 | 12.00 | 12.00 | 3.00 |

Testing

In this example, the cleaning effectiveness or cleaning efficacy of Compositions 1-5 was evaluated. In addition, commercially available alkaline cleaning compositions, e.g., UHS$^{TM/MC}$ and GP Forward$^{TM/MC}$ from Sealed Air, and commercially available neutral cleaning compositions, e.g., Prominence$^{TM/MC}$ from Sealed Air, were tested for comparative purposes. Testing for cleaning effectiveness was performed by observing the percentage of soil removal after application of a cleaning composition. As mentioned, the term soil, as used herein, may generally refer to any foreign matter on a surface.

The five non-limiting examples of the present neutral cleaning composition, along with the aforementioned commercially available cleaning compositions, were subjected to cleaning efficacy testing. Initially, each composition was diluted as disclosed, and an approximate amount of soil as disclosed was evenly deposited and spread on a strip of a tile. A sponge was used to apply an amount, i.e., approximately 15 grams, of the composition tested onto the tile and 10 strokes were performed. Further, three tiles were used for each composition tested. Similar testing methods for measuring a percent removal are disclosed in ASTM International designation number D 4488-95, a standard test method for testing cleaning performance of products intended for use on resilient flooring and washable walls. The entirety of ASTM International designation number D 4488-95 is incorporated by reference herein.

Table 3 summarizes the qualitative performance results of the cleaning efficacy testing. As shown in Table 3, a neutral floor cleaning composition achieves greater than about 50% cleaning efficiency with an HLB in the range of about 10.5 to about 12.5, with a percent total surfactant of about 15% to about 30%, and a builder percentage of about 3% to about 12% on surfactant solids.

TABLE 3

| Composition | Sample Result (%) |
|---|---|
| Composition 1 | 54 |
| Composition 2 | 51 |
| Composition 3 | 69 |
| Composition 4 | 44 |
| Composition 5 | 57 |
| UHS$^{TM/MC}$ | 44 |
| GP Forward$^{TM/MC}$ | 51 |
| Prominence$^{TM/MC}$ | 64 |

Example 2

Tables 4-6 list several compositions according to some embodiments of the present neutral floor cleaning composition. The numerical entries in the tables are weight percentages, i.e., weight %, of the specific component, based on the total composition weight. Compositions 1-11 were produced as shown below, and subsequently used in relative performance testing as described herein.

Compositions 1-9 have relatively similar chemical ingredients, but differ with respect to their relative weight percentages. In particular, Compositions 1-9 utilize water; sodium citrate as a builder, chelator, and/or pH adjusting agent; TERGITOL' 15-s-7, Lutensol® XL-70, and Lutensol® XL-40 as surfactants; sodium xylene sulfonate as a hydrotrope; Monoisopropanolamine (MIPA) as a pH adjuster; and VDISTILL™ DC01 and a commercially known fragrance as additives. Composition 10 represents another embodiment of the present neutral floor cleaner composition comprising additional additives. In this instance, Composition 10 further includes a chelator, i.e., Tetrasodium Iminodisuccinate, a dye, i.e., Liquitint® Crimson, and a preservative, i.e., Proxel® GXL. In yet another embodiment, as shown as Composition 11, the neutral floor cleaning composition may include alternative surfactants, e.g., Genapol® UD 30, and/or dyes, e.g., Liquitint® Brilliant Orange. Therefore, it should be understood that although the compositions listed in Tables 4-6 disclose some embodiments of the neutral floor cleaning composition, the invention is not necessarily so limited, and that numerous other embodiments, as described herein, may provide optimal cleaning efficacy with little to no residue and/or streaking on a surface applied thereto.

TABLE 4

Neutral Floor Cleaning Compositions

| Description | 1 | 2 | 3 | 4 | 5 |
|---|---|---|---|---|---|
| Deionized Water | 68.515 | 57.785 | 41.115 | 68.565 | 63.765 |
| Sodium Citrate, granular | 0.000 | 1.230 | 3.400 | 0.950 | 2.250 |
| Tergitol ™ 15-s-7 (secondary alcohol ethoxylate, 7 mol EO) | 0.000 | 2.000 | 4.000 | 4.000 | 0.000 |
| Sodium xylene sulfonate, 40% | 15.000 | 15.000 | 20.000 | 10.000 | 10.000 |
| VDISTILL ™ DC01 Coconut fatty acid | 0.400 | 0.400 | 0.400 | 0.400 | 0.400 |
| Monoisopropanolamine (MIPA), 99% | 0.085 | 0.085 | 0.085 | 0.085 | 0.085 |
| Commercially Available Fragrance | 1.000 | 1.000 | 1.000 | 1.000 | 1.000 |
| Lutensol ® XL-70 (HLB = 13) | 0.000 | 0.000 | 0.000 | 9.000 | 13.500 |
| Lutensol ® XL-40 (HLB = 10.5) | 15.000 | 22.500 | 30.000 | 6.000 | 9.000 |
| Total | 100.000 | 100.000 | 100.000 | 100.000 | 100.000 |

TABLE 5

Neutral Floor Cleaning Compositions

| Description | 6 | 7 | 8 | 9 | 10 |
|---|---|---|---|---|---|
| Deionized Water | 51.515 | 68.815 | 62.015 | 57.015 | 66.6574 |
| Sodium Citrate, granular | 0.000 | 1.700 | 0.000 | 1.500 | 1.000 |
| Tergitol™ 15-s-7 (secondary alcohol ethoxylate, 7 mol EO) | 2.000 | 2.000 | 4.000 | 0.000 | 5.000 |
| Sodium xylene sulfonate, 40% | 15.000 | 10.000 | 10.000 | 10.000 | 9.000 |
| VDISTILL ™ DC01 Coconut fatty acid | 0.400 | 0.400 | 0.400 | 0.400 | 0.400 |
| Monoisopropanolamine (MIPA), 99% | 0.085 | 0.085 | 0.085 | 0.085 | 0.085 |
| Commercially Available Fragrance | 1.000 | 1.000 | 1.000 | 1.000 | 2.000 |
| Lutensol® XL-70 | 18.000 | 15.000 | 22.500 | 30.000 | 9.000 |
| Lutensol® XL-40 | 12.000 | 0.000 | 0.000 | 0.000 | 6.000 |
| Tetrasodium Iminodisuccinate, 34% | — | — | — | — | 0.750 |
| Liquitint® Crimson Dye | — | — | — | — | 0.0076 |
| Proxel® GXL | — | — | — | — | 0.100 |
| Total | 100.000 | 100.000 | 100.000 | 100.000 | 100.00 |

TABLE 6

Neutral Floor Cleaning Compositions

| Description | Composition 11 wt. % (approx.) |
|---|---|
| Deionized Water | 66.6382 |
| Sodium Citrate, granular | 1.000 |
| Ethoxylated Undecyl Alcohol | 9.000 |
| Alkyloxypolyethyleneoxyethanol (Tergitol ™ 15-S-7) | 5.000 |
| Genapol ® UD 030 (C11-oxo-alcohol polyglycol ether with 3 EO) | 6.000 |

TABLE 6-continued

| Neutral Floor Cleaning Compositions | |
|---|---|
| Description | Composition 11 wt. % (approx.) |
| Sodium Xylene Sulfonate, 40% | 9.000 |
| Tetrasodium Iminodisuccinate, 34% | 0.750 |
| VDISTILL ™ DC01 Coconut Fatty Acid | 0.400 |
| Monoisopropanolamine (MIPA), 99% | 0.085 |
| Commercially Available Fragrance | 2.000 |
| Liquitint ® Brilliant Orange Dye | 0.127 |
| Total | 100.000 |

Table 7 lists measured composition properties and characteristics of Compositions 1-10. In particular, the HLB (XL Blend) value was calculated by taking the molecular mass of the hydrophilic portion of the XL surfactants and dividing by the molecular mass of the whole molecule and then multiplying by 20; the HLB (Total) value was calculated by taking the molecular mass of the hydrophilic portion of the surfactants and dividing by the molecular mass of the surfactants and then multiplying by 20; and the percent builder on surfactants was calculated by dividing the percent builder by the total percent of surfactants then multiplying by 100.

As disclosed above, the HLB value or number represents a relationship or balance between a hydrophilic portion of the surfactants and a lipophilic portion of the surfactants. In short, the higher the degree of hydrophilicity, the higher the HLB value, and the higher the lipophilicity, the lower the number. The HLB value may be as low as 4 and as high as 18.

TABLE 7

| | Composition | | | | | | | | | |
|---|---|---|---|---|---|---|---|---|---|---|
| Property | 1 | 2 | 3 | 4 | 5 | 6 | 7 | 8 | 9 | 10 |
| % XL Surfactant | 15.00 | 22.50 | 30.00 | 15.00 | 22.50 | 30.00 | 15.00 | 22.50 | 30.00 | 15.00 |
| HLB (XL Blend) | 10.50 | 10.50 | 10.50 | 12.00 | 12.00 | 12.00 | 13.00 | 13.00 | 13.00 | 12.00 |
| HLB (Total) | 10.50 | 10.63 | 10.69 | 12.02 | 12.00 | 12.01 | 12.89 | 12.86 | 13.00 | 12.03 |
| % Surfactant Solids | 15.00 | 24.50 | 34.00 | 19.00 | 22.50 | 32.00 | 17.00 | 26.50 | 30.00 | 20.00 |
| % Tergitol ™ 15-s-7 | 0.00 | 2.00 | 4.00 | 4.00 | 0.00 | 2.00 | 2.00 | 4.00 | 0.00 | 5.00 |
| % Builder on Surfactants | 0.00 | 5.02 | 10.00 | 5.00 | 10.00 | 0.00 | 10.00 | 0.00 | 5.00 | 5.00 |

As previously mentioned, embodiments of the present neutral floor cleaning composition provide a cleaning composition with optimal cleaning efficacy with limited to no streaking and/or residue. Specifically, the particular components disclosed herein, along with their compositions relative to each other, result in the aforementioned properties. In particular, the surfactants disclosed herein provide the lowest residue with the highest cleaning efficacy. Further, as previously mentioned, a builder may be used to stabilize the surfactants.

FIG. 1 illustrates the relationships between the percentage of soil removal, preferably about 54.45%, of neutral floor cleaner compositions and an HLB value, the amount of total surfactants, or the amount of the builders on the surfactants according to an embodiment of the disclosure and compared to other commercially available products. Therefore, specific parameters which may affect the performance of the neutral floor cleaning compositions were determined. Specifically, parameters for controlling cleaning efficacy and/or streaking is a combination of the HLB value, the total amount of surfactants, and a percent builder as a percentage of surfactant solids. As such, the amount of surfactants and the amount of builder used in Compositions 1-10 was varied to observe the effect thereof. Further, from FIG. 1 it was determined that the preferred values for the HLB value, the total amount of surfactants, and a percent builder as a percentage of surfactant solids may be approximately 11.5, 20.19, and 5.046, respectively.

As mentioned, and in light of FIG. 1, it was determined that the cleaning efficacy and residue ratings were directly correlated to the HLB system, the total percent surfactant, and the percent builder on surfactant solids of the composition. Hence, further testing was performed on Compositions 1-10 and specifically compared to the HLB value, percent XL surfactants, and percent builder on surfactants solids properties of the composition tested.

Testing

First, the cleaning effectiveness or cleaning efficacy of Compositions 1-11 was evaluated. In addition, commercially available alkaline cleaning compositions, i.e., UHS$^{TM/MC}$ and GP Forward$^{TM/MC}$ from Sealed Air, and a commercially available neutral cleaning composition, i.e., Prominence$^{TM/MC}$ from Sealed Air, were tested for comparative purposes. Testing for cleaning effectiveness was performed by observing the percentage of soil removal after application of a cleaning composition. As mentioned, the term soil, as used herein, may generally refer to any foreign matter on a surface.

The eleven non-limiting examples of the present neutral cleaning composition, along with the aforementioned commercially available cleaning compositions, were subjected to cleaning efficacy testing using methods known in the art. In short, each composition first underwent a 1:64 dilution. Then, an approximate amount of soil was evenly deposited and spread on a strip of a tile. A sponge was used to apply approximately 15 grams of the composition tested onto the tile and 10 strokes performed. Further, three tiles were used for each composition tested. Similar testing methods for measuring a percent removal are disclosed in ASTM International designation number D 4488-95, a standard test method for testing cleaning performance of products intended for use on resilient flooring and washable walls. The entirety of ASTM International designation number D 4488-95 is incorporated by reference herein. Composition 10 was also subjected to testing using the testing method disclosed in ASTM International designation number D 4488-95 and using a colorimeter.

In addition, a second test was performed to determine a streak rating relative to an amount residue present on a surface the cleaning composition is applied thereto. The cleaning compositions described in Tables 4-6, along with the aforementioned commercially available alkaline and neutral cleaning compositions, were subjected to residue testing as follows. 1:128 dilutions were performed on the composition tested. Then, the composition tested was deposited and evenly distributed on a tile. A 3-point scale (0-3) was used to qualitatively rank the overall residue observed. A score of "0" indicates that no visible residue was detected on the tile. A score of "3" indicates that a considerable residue was visible. Similar testing methods for measuring a streak or residue rating may be a standard test method for evaluating a filming and streaking characteristic of a product intended from use on a glass surface, such as windows or mirrors, under CSPA designation number DCC-09A, the entirety of which is incorporated by reference herein. Alternative methods may also be used to determine a residue and/or streak rating.

Table 8 summarizes the qualitative performance results of the cleaning efficacy and the residue testing. As shown in Table 8, using the compositions of Table 7, a neutral floor cleaning composition would achieve greater than 50% cleaning efficacy, or preferably about 55% cleaning efficiency, with an HLB in the range of about 10.5 to about 12.5, with a percent total surfactant of about 15% to about 30%, and a builder percentage of about 3% to about 12% on surfactant solids.

As previously disclosed, Composition 10 was further tested using the testing method disclosed under ASTM International designation number D 4488-95 and using a colorimeter. During this experiment, the percent removal was determined to be 54.79%. By contrast, the percent removal for Composition 10 was determined to be 55.25% when tested with the method used herein. As a result, it was determined that the testing methods used herein, and the results thereof, closely mimic the testing method disclosed under the ASTM International designation number D 4488-95. However, alternative methods may also be used to determine a cleaning efficacy.

TABLE 8

| Composition | Sample Result (%) | pH | Streak |
|---|---|---|---|
| Composition 1 | 44.07 | 7.67 | 0 |
| Composition 2 | 65.27 | 7.68 | 0 |
| Composition 3 | 72.10 | 7.57 | 0 |
| Composition 4 | 52.89 | 7.83 | 0.5 |
| Composition 5 | 55.95 | 7.83 | 0 |
| Composition 6 | 64.49 | 7.45 | 1 |
| Composition 7 | 47.71 | 7.6 | 0 |
| Composition 8 | 66.69 | 7.57 | 2.5 |
| Composition 9 | 66.50 | 7.56 | 3 |
| Composition 10 | 55.25 | 7.55 | 0 |
| Composition 11 | 49.80 | 7.58 | 0.5 |
| UHS$^{TM/MC}$ | 47.98 | 10.51 | 3 |
| GP Forward$^{TM/MC}$ | 47.22 | 10.05 | 2.5 |
| Prominence$^{TM/MC}$ | 58.46 | 7.46 | 2.5 |

As shown in Table 8, many of the presently disclosed neutral cleaning compositions demonstrate the improved cleaning properties. In particular, the improved cleaning properties are a result of the unique combination of chemicals, e.g., the at least one water-soluble alkyl polyalkylene glycol ether and the least one water-insoluble alkyl polyalkylene glycol ether, of embodiments of the present neutral floor cleaner. In the preferred embodiment, the neutral floor cleaning composition demonstrates improved cleaning properties over at least two commercially available alkaline cleaning compositions, i.e., UHS$^{TM/MC}$ and GP Forward$^{TM/MC}$ from Sealed Air, and at least one commercially available neutral cleaning composition, i.e., Prominence$^{TM/MC}$.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

The present disclosure provides neutral floor cleaner compositions containing at least two cleaning agents. The present disclosure also provides methods for using these neutral floor cleaner compositions.

Numerous modifications to the present disclosure will be apparent to those skilled in the art in view of the foregoing description. Accordingly, this description is to be construed as illustrative only and is presented for the purpose of enabling those skilled in the art to make and use the embodiments of the disclosure and to teach the best mode of carrying out same. The exclusive rights to all modifications which come within the scope of the appended claims are reserved.

We claim:

1. A cleaning composition comprising:

a first cleaning agent, wherein the first cleaning agent is water-soluble at room temperature;

a second cleaning agent, wherein the second cleaning agent is water-insoluble at room temperature, wherein the first cleaning agent and the second cleaning agent are in a total amount of about 15 wt. % to about 30 wt. %, wherein the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order, wherein a blend of the first cleaning agent and the second cleaning agent has a hydrophilic-lipophilic balance ranging from about 10.5 to about 12.5.

2. The cleaning composition of claim 1, wherein the blend of the first cleaning agent and the second cleaning agent has a hydrophilic-lipophilic balance is about 11.5.

3. The cleaning composition of claim 2, wherein the first cleaning agent and the second cleaning agent are in a total amount of about 20 wt. %.

4. The cleaning composition of claim 3, wherein the cleaning composition further includes a builder.

5. The cleaning composition of claim 4, wherein a percent of the builder on a total amount of the first and the second cleaning agent is in a range from about 1% to about 10%.

6. The cleaning composition of claim 5, wherein the percent of the builder on a total amount of the first and the second cleaning agent is about 5%.

7. The cleaning composition of claim 6, wherein the at least one builder is in an amount about 0.1 wt. % to about 4 wt. %.

8. The cleaning composition of claim 7, wherein the builder is an organic salt.

9. The cleaning composition of claim 8, wherein the organic salt is sodium citrate.

10. The cleaning composition of claim 1, wherein the composition further comprises at least one stabilizer.

11. The cleaning composition of claim 10, wherein the at least one stabilizer makes the alkyl polyalkylene glycol ether that is water-insoluble disperse in water.

12. The cleaning composition of claim 1, wherein the cleaning composition further comprises an alcohol ethoxylate.

13. The cleaning composition of claim 12, wherein the alcohol ethoxylate is in an amount of about 2 wt. % to about 6 wt. %.

14. The cleaning composition of claim 1, wherein the cleaning composition has a pH value of about 6.5 to about 8.5.

15. A cleaning composition comprising:

a first cleaning agent;

a second cleaning agent, wherein the first cleaning agent and the second cleaning agent are in a total amount of about 15 wt. % to about 30 wt. %, wherein the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order, wherein a blend of the first cleaning agent and the second cleaning agent has a hydrophilic-lipophilic balance ranging from about 10.5 to about 12.5, wherein the cleaning composition has a pH value of 6.5 to 9.

16. The cleaning composition of claim 15, wherein the cleaning composition includes at least one builder.

17. The cleaning composition of claim 15, wherein the blend of the first cleaning agent and the second cleaning agent has a hydrophilic-lipophilic balance is about 11.5.

18. The cleaning composition of claim 15, wherein the first cleaning agent and the second cleaning agent are in a total amount of about 20 wt. %.

19. The composition of claim 15, wherein the composition further comprises a stabilizer.

20. A cleaning composition comprising:

a first cleaning agent;

a second cleaning agent; and at least one builder, wherein the first cleaning agent and the second cleaning agent are in a total amount of about 15 wt. % to about 30 wt. %, wherein the first cleaning agent and the second cleaning agent are alkyl polyalkylene glycol ether Guerbet surfactants having a hydrophilic-lipophilic balance of at least 10.5 and a formula $RO(LO)_k(CH_2CH_2O)_mH$, wherein R is a branched $C_8$-$C_{12}$ alkyl group, L is $CH_2CH_2CH_2$ or $CH_2CH_2CH_2CH_2$, k is from 1-2, m is from 2 to 14, and the LO and $CH_2CH_2O$ groups are in random or block order, wherein the first cleaning agent is water-soluble at room temperature and the second cleaning agent is water-insoluble at room temperature, wherein a blend of the first cleaning agent and the second cleaning agent has a hydrophilic-lipophilic balance of about 11.5, wherein the first cleaning agent and the second cleaning agent are in a total amount of about 20 wt. %, and wherein the cleaning composition has a pH value of 6.5 to 9.

* * * * *